(12) United States Patent
Sterner

(10) Patent No.: US 11,204,124 B2
(45) Date of Patent: Dec. 21, 2021

(54) INVERSION UNIT WITH EXPANDABLE CARRYING HANDLES AND REMOVABLE WHEELBASE

(71) Applicant: Sacpro AB, Falun (SE)

(72) Inventor: Fredrik Sterner, Falun (SE)

( * ) Notice: Subject to any disclaimer, the term of this patent is extended or adjusted under 35 U.S.C. 154(b) by 159 days.

(21) Appl. No.: 16/786,920

(22) Filed: Feb. 10, 2020

(65) Prior Publication Data

US 2020/0263821 A1 Aug. 20, 2020

Related U.S. Application Data

(60) Provisional application No. 62/806,842, filed on Feb. 17, 2019.

(51) Int. Cl.
*F16L 55/18* (2006.01)
*F16L 55/165* (2006.01)

(52) U.S. Cl.
CPC ........... *F16L 55/1651* (2013.01); *F16L 55/18* (2013.01)

(58) Field of Classification Search
CPC ..... F16L 55/16; F16L 55/1651; F16L 55/179; F16L 55/18; B29C 63/0086; B29C 63/36
USPC ............ 138/98, 97; 405/150.1; 156/287, 94; 264/269, 36.17, 516; 425/11, 387.1
See application file for complete search history.

(56) References Cited

U.S. PATENT DOCUMENTS

| | | | |
|---|---|---|---|
| 4,685,983 A | 8/1987 | Long, Jr. | |
| 6,032,698 A * | 3/2000 | Schwert | F16L 55/1651 138/97 |
| 6,539,979 B1 * | 4/2003 | Driver | F16L 55/1651 138/97 |
| 6,942,426 B1 | 9/2005 | Kampbell et al. | |
| 7,766,048 B2 | 8/2010 | Driver et al. | |
| 9,534,726 B1 | 1/2017 | Strom | |
| 10,065,359 B2 | 9/2018 | Kiest, Jr. | |
| 10,302,238 B2 | 5/2019 | Lokkinen | |
| 2006/0048832 A1 | 3/2006 | Blackmore et al. | |
| 2006/0159791 A1 * | 7/2006 | Kamiyama | B29C 63/36 425/11 |
| 2007/0240779 A1 * | 10/2007 | Kamiyama | F16L 55/1651 138/98 |
| 2011/0297243 A1 * | 12/2011 | Kiest, Jr. | F16L 55/1645 137/15.08 |
| 2015/0020908 A1 * | 1/2015 | Warren | F16L 55/18 138/97 |
| 2016/0010781 A1 * | 1/2016 | Kiest, Jr. | F16L 55/16455 138/98 |
| 2018/0229424 A1 | 8/2018 | Bichler et al. | |
| 2018/0292041 A1 * | 10/2018 | Lokkinen | B65H 75/4471 |
| 2019/0232548 A1 * | 8/2019 | Lokkinen | B29C 63/0073 |

* cited by examiner

*Primary Examiner* — Patrick F Brinson

(57) ABSTRACT

An inversion unit assembly is provided that is releasably connected to a wheelbase such that the inversion unit can be quickly removed from the wheelbase and carried separately from the inversion unit. The assembly includes a lining drum having a cylindrical body having an open end and a viewing opening. The lining drum includes two inlets for compressed air and an outlet for liner. The lining drum also includes a rotatable wheel secured to an internal shaft for which the liner can be released from the drum in a controllable fashion. The assembly also includes a wheelbase that can be separated from the inversion lining drum wherein the wheelbase includes a plurality of locking mechanisms and wheels.

20 Claims, 11 Drawing Sheets

INVERSION UNIT WITH EXPANDABLE CARRYING HANDLES AND REMOVABLE WHEELBASE

CROSS-REFERENCE TO RELATED APPLICATION

This application claims priority to provisional patent application 62/806,842 filed Feb. 17, 2019, the entire contents of which are incorporated herein by reference.

BACKGROUND

1. Field of the Invention

The invention relates generally to inversion unit with expandable carrying handles and removable wheelbase

2. Background

Currently there are a number of solutions for relining pipe using inversion drums which are adapted to improve usability and transportability. Some of these solutions focus on adding wheels to a framework allowing for transportation of the inversion drum. These solutions fail to meet the needs of the industry because such solutions employ a fixed connection to the inversion drum. As a result of this design the system can be difficult to carry and use in small spaces unless the system is miniaturized significantly, but doing so limits capacity of the system.

In order to solve the problem associated with the need for miniaturization, other solutions have proposed to eliminate the framework with rollers and create a smaller footprint, which can fit in tighter spaces. Unfortunately, this solution requires the use of more people to carry the heavy unit and makes one person use more difficult. As a result, devices employing the roller-less framework are less desirable because of additional workers required for a job.

SUMMARY OF THE INVENTION

It would be desirable to have an inversion unit which can be quickly and easily removed from a transportable wheelbase to promote improved carrying of the inversion unit into a small space. Furthermore, it would also be desirable to have an inversion unit with positionable carrying handles. Therefore, there currently exists a need in the industry for an inversion unit capable of efficient disassembly and reassembly and can be positioned to adapt to each individual.

In one embodiment, an inversion unit is disclosed with the following: a generally cylindrical drum having generally curved sides; the generally cylindrical drum operable to invert a liner with at least one opening; the opening disposed on the surface of the generally cylindrical drum; a shaft disposed inside of the generally cylindrical drum at a central axis of the generally cylindrical drum and operable to allow the liner to wrap and unwrap around the shaft; a drum handle coupled to the center shaft and disposed outside the generally cylindrical drum and operable to rotate the shaft; a locking plate coupled to the generally cylindrical drum and the drum handle and disposed outside the generally cylindrical drum; at least one arcuate rail, the arcuate rail coupled to the generally cylindrical drum; a frame assembly, the frame assembly comprising a plurality of supports and the supports in contact with the arcuate rail to permit the rotation of the drum on the frame approximately around the central axis of the generally cylindrical drum and position the generally cylindrical drum and the opening in a desired orientation; the frame assembly further comprising a handle and a brake assembly; the break assembly coupled to the handle and the arcuate rail; wherein the arcuate rail is located within the outermost point of the curved sides; wherein when the brake assembly is disengaged, the drum is free to rotate on the supports; wherein when the brake assembly is engaged, the drum is not permitted to rotate on the supports; and wherein when the drum handle has a locked state and an unlocked state; the unlocked state permitting the drum handle to rotate and the liner to exit the drum, and the locked state does not permit the drum handle to rotate and the liner to exit the drum. Furthermore, the supports are made up of a plurality of lower rollers and at least one upper roller, and the arcuate rail is disposed between the plurality of lower rollers and the at least one upper roller; at least one internal separator wheel; the internal separator wheel disposed within the generally cylindrical drum and coupled to the shaft; wherein the internal separator wheel is operable to permit individual point contact to the liner and is axial adjustable along the shaft; wherein the at least one arcuate rail forms a complete circle; a sight window; the sight window removably coupled on the surface of the generally cylindrical drum and operable to permit viewing of the inside of the generally cylindrical drum; at least one input valve, at least one release valve, at least one pressure gauge, and at least one pressure relief valve; the at least one input valve disposed on the generally cylindrical drum and operable to permit the entrance of a gas into the drum; the at least one release valve disposed on the generally cylindrical drum and operable to permit the exit of a gas out of the drum; the at least one pressure gauge disposed on the generally cylindrical drum and operable to measure the pressure within the drum, and the at least one pressure relief valve disposed on the generally cylindrical drum and operable to permit the exit of a gas out of the drum when the pressure within the drum exceeds a predetermined valve; a set of adjustable handles wherein the adjustable handles are releasably coupled to the frame assembly; wherein the adjustable handles can be secured in a first position, a second position, and wherein the adjustable handles can be completely removed from the frame assembly; and wherein the device is rated as a pressure vessel.

In another embodiment, an inversion unit is disclosed with the following: a generally cylindrical drum having generally curved sides, the generally cylindrical drum operable to invert a liner; at least one opening, the opening disposed on the surface of the generally cylindrical drum; a shaft disposed inside of the generally cylindrical drum at a central axis of the generally cylindrical drum and operable to allow the liner to wrap and unwrap around the shaft; a drum handle coupled to the center shaft and disposed outside the generally cylindrical drum and operable to rotate the shaft; a locking plate coupled to the generally cylindrical drum and the drum handle and disposed outside the generally cylindrical drum; at least one arcuate rail, the arcuate rail coupled to the generally cylindrical drum; a frame assembly, the frame assembly comprising a plurality of supports, the supports in contact with the arcuate rail to permit the rotation of the drum on the frame approximately around the central axis of the generally cylindrical drum and position the generally cylindrical drum and the opening in a desired orientation; the frame assembly further comprising a handle and a brake assembly; the break assembly coupled to the handle and the arcuate rail; a base assembly, the base assembly releasably coupled to the frame assembly and further comprising a plurality of wheels, the wheels operable to permit movement of the device across a surface; wherein the arcuate rail is located within the outermost point of the curved sides; wherein when the brake assembly is disengaged, the drum is free to rotate on the supports; wherein when the brake assembly is engaged, the drum is not permitted to rotate on the supports; and wherein when the drum handle has a locked state and an unlocked state; the unlocked state permitting the drum handle to rotate and the liner to exit the drum, and the locked state does not permit the drum handle to rotate and the liner to exit the drum. Furthermore, the supports are made up of a plurality of lower rollers and at least one upper roller, and the arcuate rail is disposed between the plurality of lower rollers and the at least one upper roller; at least one internal separator wheel; the internal separator wheel disposed within the generally cylindrical drum and coupled to the shaft; wherein the internal separator wheel is operable to permit individual point contact to the liner and is axial adjustable along the shaft, wherein the at least one arcuate rail forms a complete circle; a sight window; the sight window removably coupled on the surface of the generally cylindrical drum and operable to permit viewing of the inside of the generally cylindrical drum; further comprising at least one input valve; at least one release valve; at least one pressure gauge; and at least one pressure relief valve; the at least one input valve disposed on the generally cylindrical drum and operable to permit the entrance of a gas into the drum; the at least one release valve disposed on the generally cylindrical drum and operable to permit the exit of a gas out of the drum; the at least one pressure gauge disposed on the generally cylindrical drum and operable to measure the pressure within the drum; the at least one pressure relief valve disposed on the generally cylindrical drum and operable to permit the exit of a gas out of the drum when the pressure within the drum exceeds a predetermined valve; further comprising a set of adjustable handles, wherein the adjustable handles are releasably coupled to the frame assembly, wherein the adjustable handles can be secured in a first position, a second position, and wherein the adjustable handles can be completely removed from the frame assembly; wherein the device is rated as a pressure vessel.

The disclosed system is unique because it improves single user operation, reduces the overall footprint of the inversion unit, adds ergonomic transportation with carrying options, and reduces the overall weight of the system.

The disclosed system is superior to other known inversion units because it provides a system: which employs an external arcuate rail disposed within the outer most edge of the drum supporting miniaturization; employs a rolling wheelbase which allows for improved transportation and is efficiently removed to promote a light weight inversion unit with a small footprint for use in small spaces; and adjustable handles promoting an ergonomic carrying position.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Inversion Unit With Expandable Carrying Handles And Removable Wheelbase may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION

The present invention is directed to inversion unit with expandable carrying handles and removable wheelbase In its most complete version, the assembly is made up of the following components: (1) an drum having a right side, a left side, a center cylinder, with the right and left sides being substantially parallel to each other and welded to the center cylinder creating an inner cavity; (2) a liner outlet disposed on the peripheral surface of the center cylinder sized and shaped to accept a pipe liner; (3) a receiving portion clamp connected to the the liner outlet, and which facilitates clamping of the pipe liner to the liner outlet; (4) at least one substantially circular or arcuate rail attached to the left side, right side, or both; (5) a pressure gauge attached to the peripheral surface of the center cylinder and measuring the pressure of the internal cavity; (6) a pressure relief valve attached to the peripheral surface of the center cylinder allowing the rapid escape of a pressurized media at a predetermined pressure; (7) a viewing opening on the peripheral surface of the center cylinder wherein a window and window clamp are attached to the viewing opening for monitoring the internal cavity of the drum; (8) at least one pressurized media inlet threadedly connected to a threaded coupling mounted on the peripheral surface of the center cylinder, and allowing the intake of a pressurized media; (9) a release valve attached to the peripheral surface of the center cylinder and promotes the release of media from within the drum; (10) a supporting base comprising rollers for which the support rail rests upon and allows for rotational positioning about a central axis which passes through the center cylinder, left side, right side, and inner cavity; (11) a formed handle mounted to the supporting base and shaped around the drum to create a rear handle engagement along with at least one receiving region alongside the supporting base; (12) at lease one carrying handle shaped and sized to fit within the formed handle and selectively positioned within the formed handle; (13) a brake affixed to the formed handle and providing a slotted region for acceptance of the arcuate rail; (14) the locking brake supporting a lever by which a friction pad engages the ring thereby inhibiting rotation about the central axis; (15) a wheelbase sized and shaped to accept the supporting base and provide releaseable engagement between the wheelbase and the supporting base; (16) the wheelbase comprising at least one wheel connected through an axle and which may or may not include a locking feature; (17) at least one internal separator wheel disposed within the drum on the central shaft and permit point contact with a liner.

Figure 1:
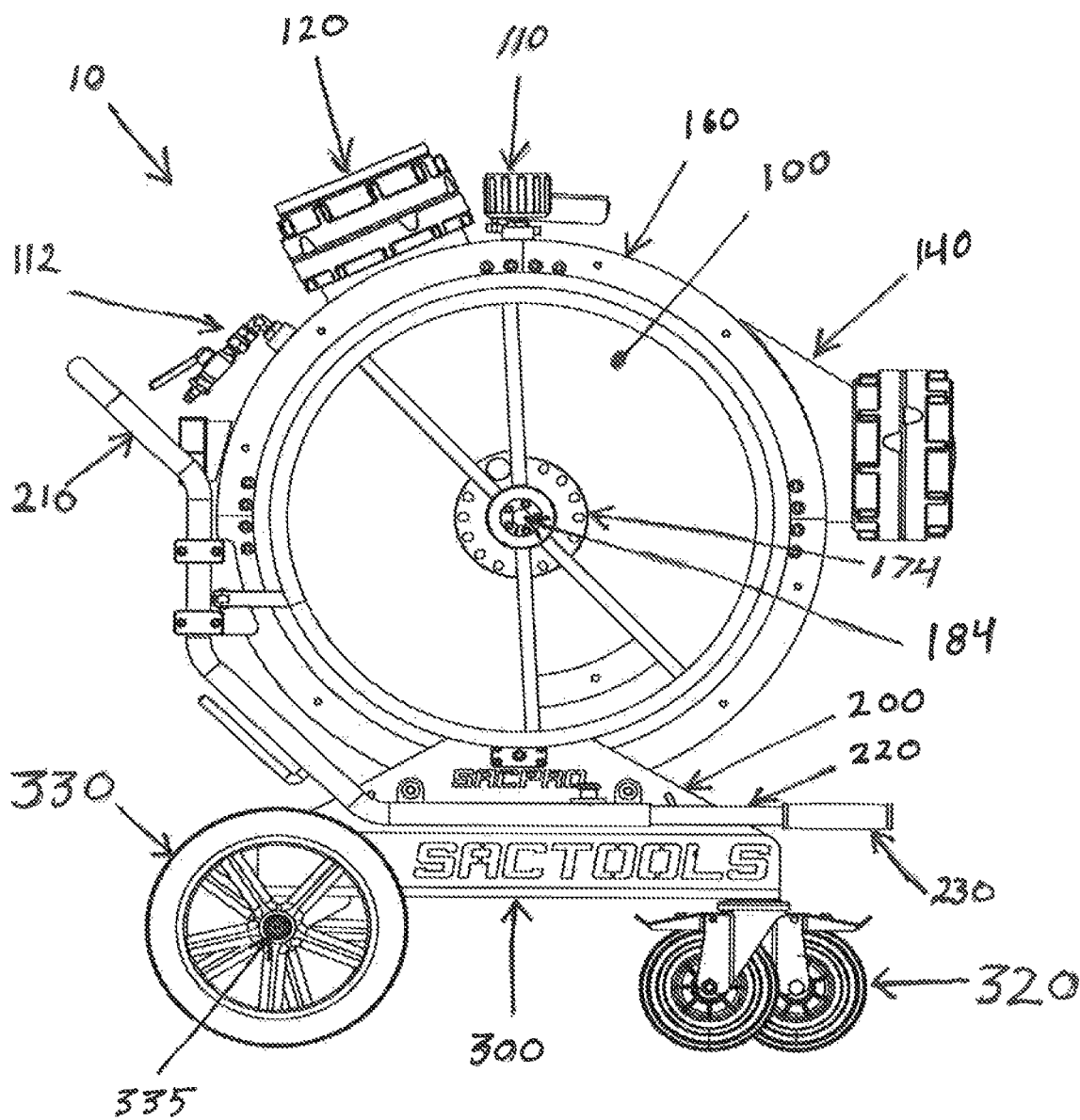
FIG. 1.—is a side view of the inversion system

Referring now to FIG. 1, a diagram is shown illustrating the side view of an inversion system (10) in accordance with an exemplary embodiment of the invention. As shown, the inversion system (10) includes an inversion drum assembly (100) rotatably mounted to a frame assembly (200) and further mounted to a base assembly (300). The inversion drum assembly (100) includes a liner outlet (140) by which a pipe liner used in relining pipes both enters and exits the inversion drum assembly (100). The inversion drum assembly (100) also includes a manometer (110) for measuring the internal pressure of the inversion drum assembly (100). A removable viewing window (120) is included in the inversion drum assembly (100) and allows for the visual monitoring within the drum. Also included in the assembly is at least one inlet valve (112) which allows for a pressurized gas, preferably compressed air, but is not limited to compressed air, to enter the inversion drum creating the required pressure to push the liner out of the drum and down a pipe.

To minimize the footprint of the inversion system (10), at least one ring (160) is attached at least one side of the inversion drum (100). The ring (160), which may be a single piece ring or a plurality of segments, rides on at least one roller (340) mounted in the frame assembly (200), and facilitates the rotation of the inversion drum assembly (100) about a central axis which can be defined as the axis created through the center of the drum or by the center shaft (184). The position of the ring (160) and roller (340) eliminates the need for extended components thereby allowing the system to be smaller and fit in areas where conventional inversion drums would not normally fit. The frame assembly (200) includes a handle (210) sized and shaped to fit around the formed base of the frame assembly (200) and includes a hollow interior for acceptance of an adjustable handle (220). The adjustable handle (220) includes a grip (230) shaped to fit over the adjustable handle (220) and generally rubber, neoprene, or other polymeric material. The adjustable handle comprises holes sized and shaped to receive a pin from a plunger (225) thereby locking the handle in place radially and axially within the handle (210).

The inversion system (10) may further include a base assembly or wheel base (300). The base assembly (300) includes at least two rear wheels (330) and two front wheels (320). The rear wheels (330) may be of the fixed direction variety and attached by an axle (335) mounted to the base assembly (300) but are not limited to such types of wheels. The front wheels (320) are intended to pivot about a vertical axis most commonly known as casters thereby allowing the inversion system (10) to roll and change direction. The front wheels (320) or the rear wheels (330) may also include locking provisions which inhibit the movement of the system and holds the system in place during transportation or operation.

Figure 2:
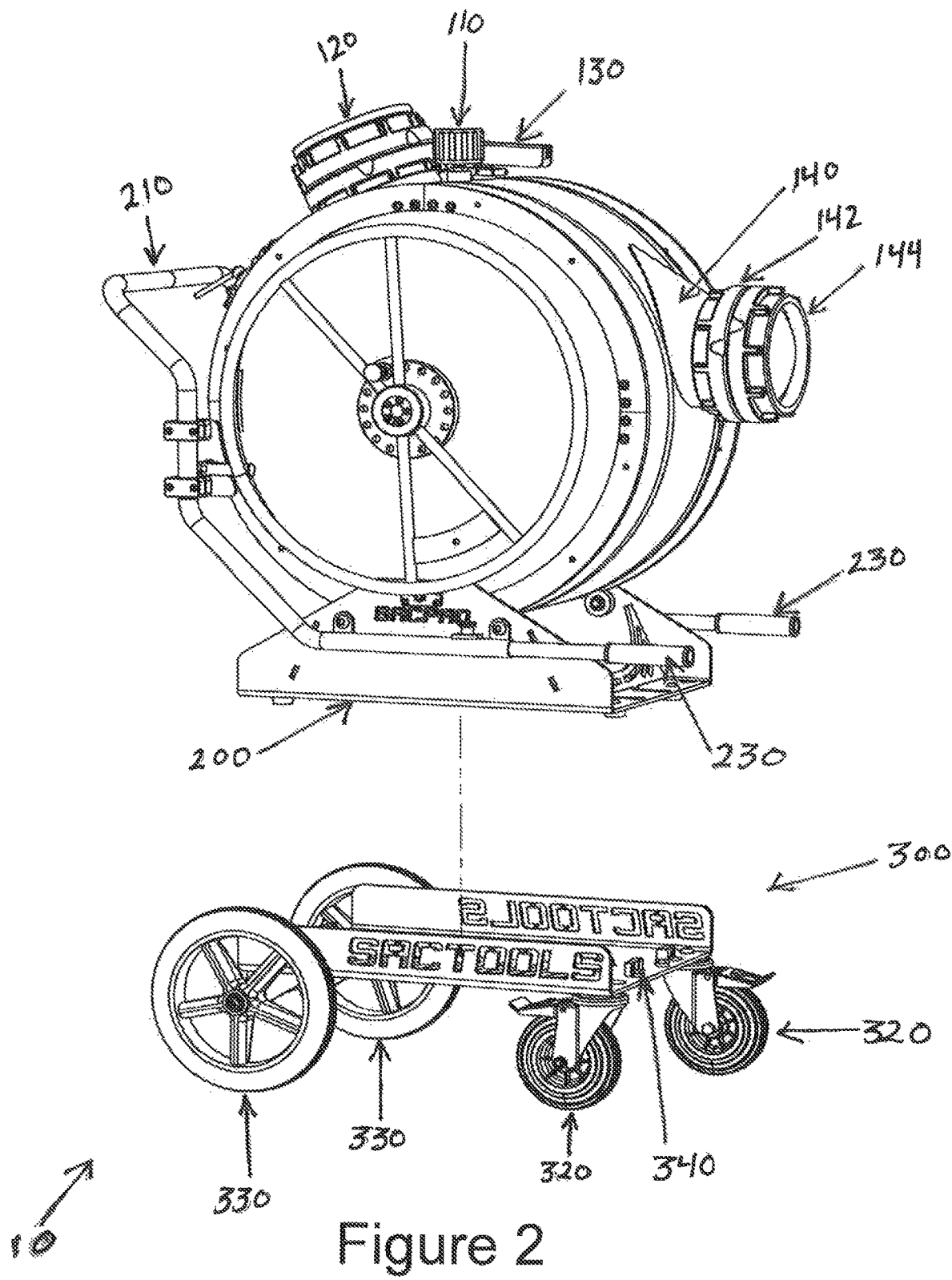
FIG. 2.—is a perspective view of the inversion unit and wheelbase

Now referring to FIG. 2, a perspective view of the inversion system (10) is shown with the base assembly or wheel base (300) removed from the frame assembly (200) and the inversion drum (100). The base assembly (300) includes at least one releasable locking provision (340) which is typically in the form of a lock knob which allows for engagement with the frame assembly (200) and is rotated to hold the frame assembly (200) to the base assembly (300). However, the releasable locking provision (340) may also be configured as a ball detent, clip, fastener, or any other means for releasably connecting two parts together. The frame assembly (200) includes a flat bottom which promotes positive engagement with the base assembly (300) which includes a flat receiving area and folded sides. The inversion system (10) may be separated by way of rotating the locking provision (340) and to align with an open hole in the frame assembly (200) and lifting the frame assembly (200) and inversion drum (100) vertically off the base assembly (300). Allowing the system to separate in this way allows for the efficient transportation and operation in confined areas.

Figure 3:
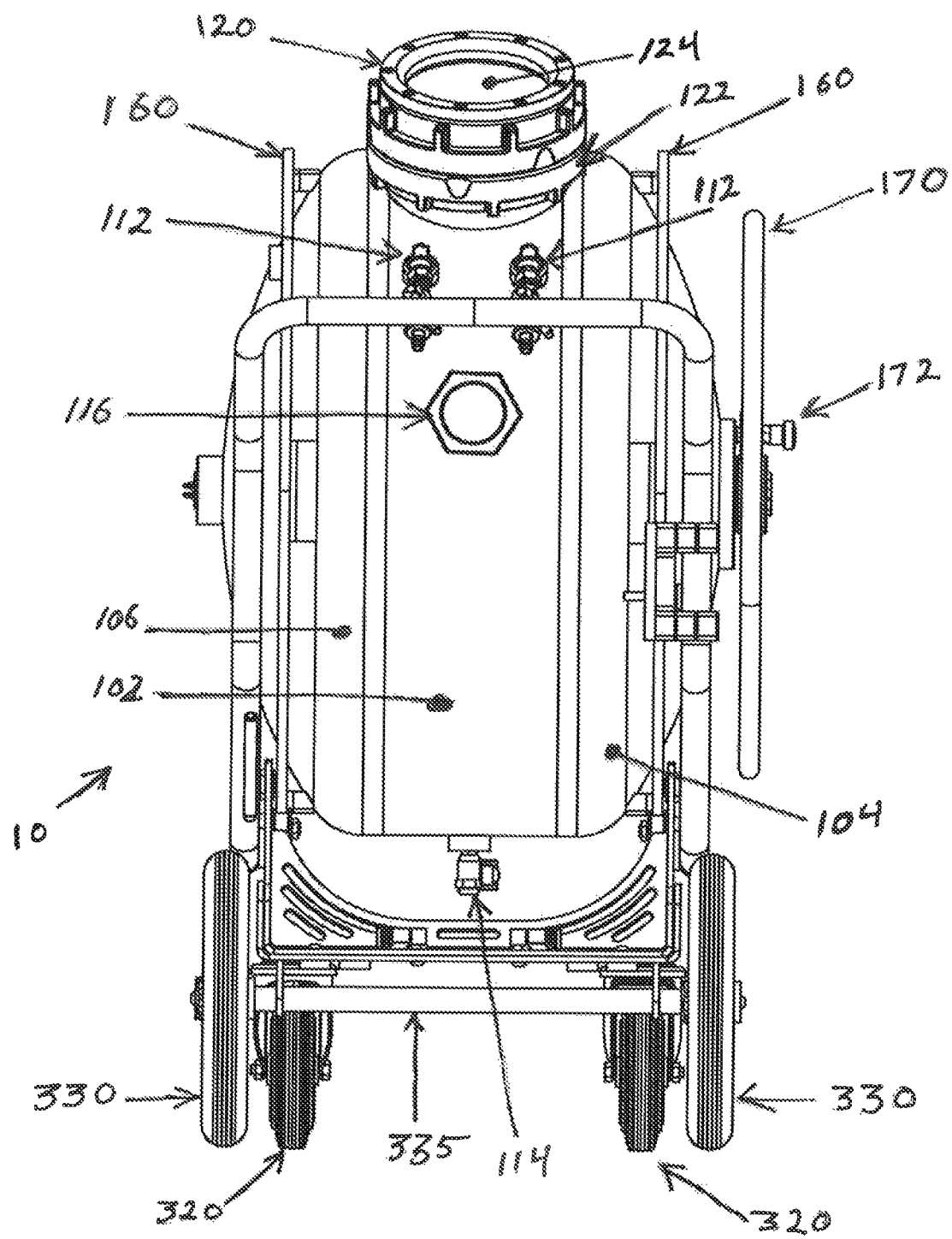
FIG. 3.—is a rear view of the inversion system

Now referring to FIG. 3, a rear view of the inversion system (10) is shown. Focusing on the drum construction, the inversion drum comprises a right side (104), a center cylinder (102), and a left side (106). The left side (106) and the right side (104) are shown to have a partial spherical shape which promotes pressure distribution evenly across the surface when used as a pressure vessel. The center cylinder (102) is shown with a peripheral surface where attachments may be mounted and a hollow interior. The left side (106), center cylinder (102), and right side (104) are further connected to each other through a complete weld of the seems. However, these three components could otherwise be connected through a series of fasteners evenly distributed around the outer most edge. As such, the connection of the three components creates a hollow interior for the acceptance of additional components, pipe liner, and a compressed gas, preferably compressed air.

Connected around the peripheral surface of the center cylinder (102) is a release valve (114), a small viewing window (116), at least one inlet valve (112), and large viewing window comprising a securing ring (120) and a viewing glass (124). The release valve (114) promote release of media from the drum through a combination of gravity and internal drum pressure. The small viewing window (116), which may or may not be removable, allows for the visual inspection of the internal system. The inlet valve (112), facilitates the entrance of the compressed gas into the drum by way of connection to a compression source. Compression sources are typically identified as an air compressor. When the inversion drum (100) is equipped with two inlet valves (112), one inlet valve (112) is used to allow compressed gas into the drum while the second inlet valve (112) may be used as an evacuation valve, releasing the compressed gas from the drum. A large viewing window (120 & 124) is provided, which is typically removable but may also be permanently fixed to the drum, to further inspect the interior of the drum during operation.

Affixed to the right side (104) and the left side (106) are a plurality of semi-circular rails (160). The rails are fastened to the drum but is not limited to only conventional fasteners means. In the preferred embodiment, a plurality of semi-circular rails (160) are affixed to the sides to create a complete ring around the otter edge of the sides (104 & 106). The rails promote rotation about a center axis which passes through the center cylinder (102), the left side (106), and the right side (104).

Further connected to the right side (104) and left side (106) through a center shaft (184) is a drum handle (170). The drum handle (170) is connected directly to the center shaft (184) and is further connected through bearings to the left and right sides (106 & 104). The drum handle (170) is permitted to rotate freely from the drum and facilitates the winding and unwinding of the pipe liner. During operation of the system, the compressed gas enters the drum and is maintained within the drum until the drum handle (170) is permitted to rotate and feed the liner out of the drum and down the pipe. To prevent unwanted rotation the drum handle (170) and feeding of the liner, a biased plunger pin (172) is employed to engage a locking plate (174).

Figure 4:
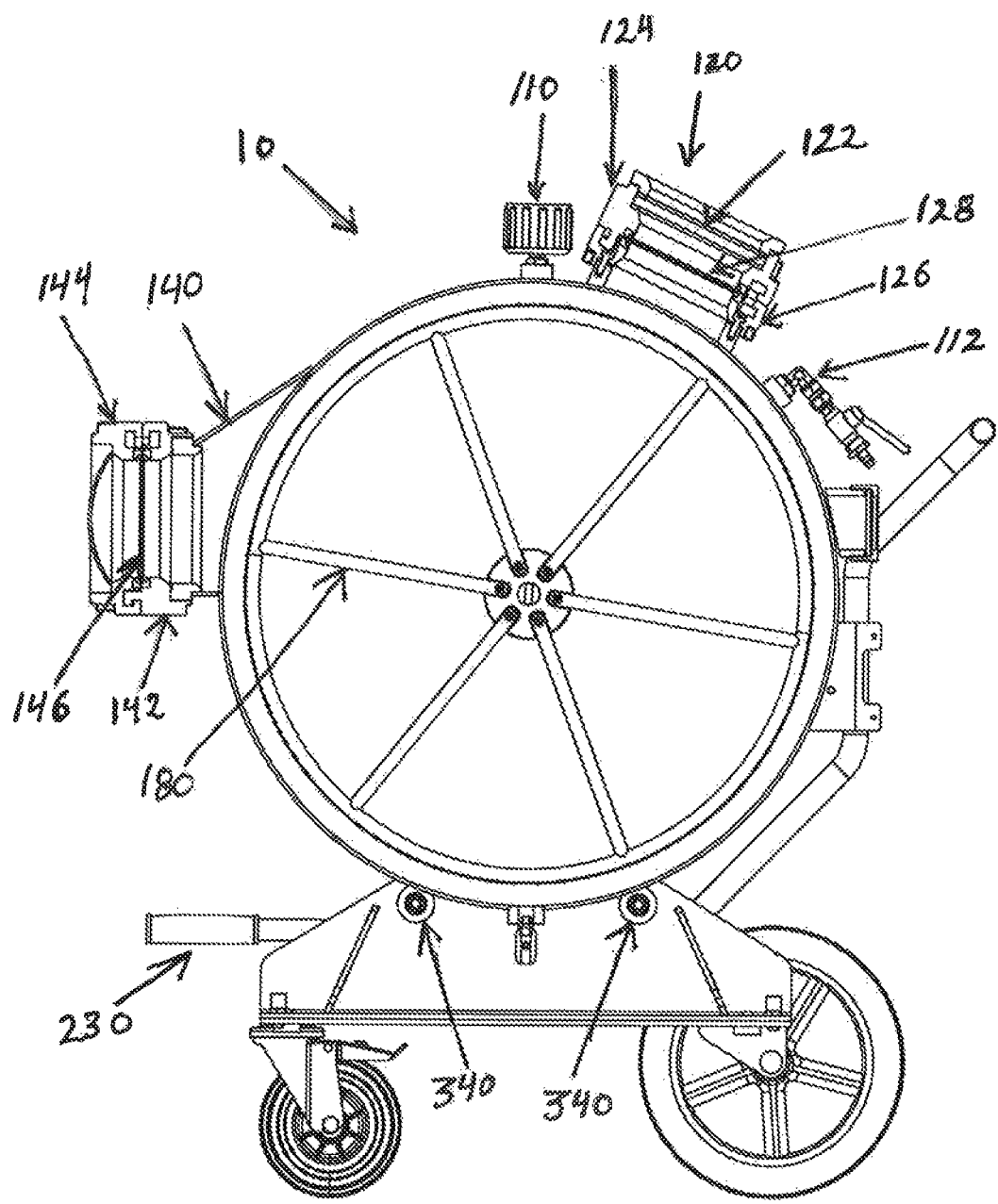
FIG. 4.—is a side cross-section view of the inversion system

Now referring to FIG. 4, a cross-section of the inversion system (10) is shown. As identified previously, the drum comprises a hollow interior which is used for the pipe liner and additional system components. At least one adjustable separator wheel (180) is adjustably connected to the center shaft (184). Movement of the separator wheel (180) is allowed axially with the center shaft (184) thereby promoting support for various sizes of pipe liner. The inversion system (10) is generally capable of supporting liner diameters ranging from 50 mm to 225 mm and liner lengths up to 100 m. Engagement of the separator wheel (180) with the center shaft (184) is primarily by way of a fastener but is not limited to such means. In the preferred embodiment, two separator wheels (184) are used to promote the liner lying as close to the midpoint of the liner outlet as possible. In the preferred embodiment, the separator wheels (184) are made from round tubing and promotes minimal contact with the liner thereby reducing friction between the liner and the separator wheels (184).

Further connected to the peripheral surface of the drum is a liner outlet (140) which as identified previously, allows for entrance and exit of the liner from the inversion drum (100). Connected to the liner outlet (140) is a coupling base (142). The coupling base (142) is permanently fixed to the liner outlet (140) and comprises a recess for acceptance of a outlet gasket (146). The gasket (146) is preferably an elastomeric o-ring but is not limited such and could be a felt, paper, or other type of sealing material and shape. Further connected to the outlet is a coupling lid (144). The coupling lid (144) promotes sealing of the system and engagement of an inversion cone. Proper sealing and engagement is necessary to ensure the internal pressure of the drum pushes the liner out of the drum.

The viewing window assembly mounted on the peripheral surface of the drum comprises viewing base (122), a viewing gasket (128), a viewing glass (124), and a viewing lid (120). The viewing lid (120) houses the viewing glass (124) and is removably connected to the viewing base (122) by which a gasket (128) is compressed in between and thereby creating a seal as to inhibit escape of the compressed gas within the drum. The glass (124) is primarily tempered hardened glass but could also be other suitable transparent materials such as plastic. The gasket (128) is preferably an elastomeric o-ring but is not limited such and could be a felt, paper, or other type of sealing material and shape.

Rotatably connected to the frame assembly (200) is the support rollers (340). The support rollers (340) are mounted to the frame assembly (200) and are attached such that they are permitted to spin radially while also supporting the weight of the inversion drum (100) through the rails (160). While it is conceivable that one roller (340) position in the center of the frame assembly would be sufficient to roll and support the weight of the drum (100), it is preferable to have two or more rollers (340) on each side of the frame assembly (200) to evenly distribute the load of the inversion drum (100).

Figure 5:
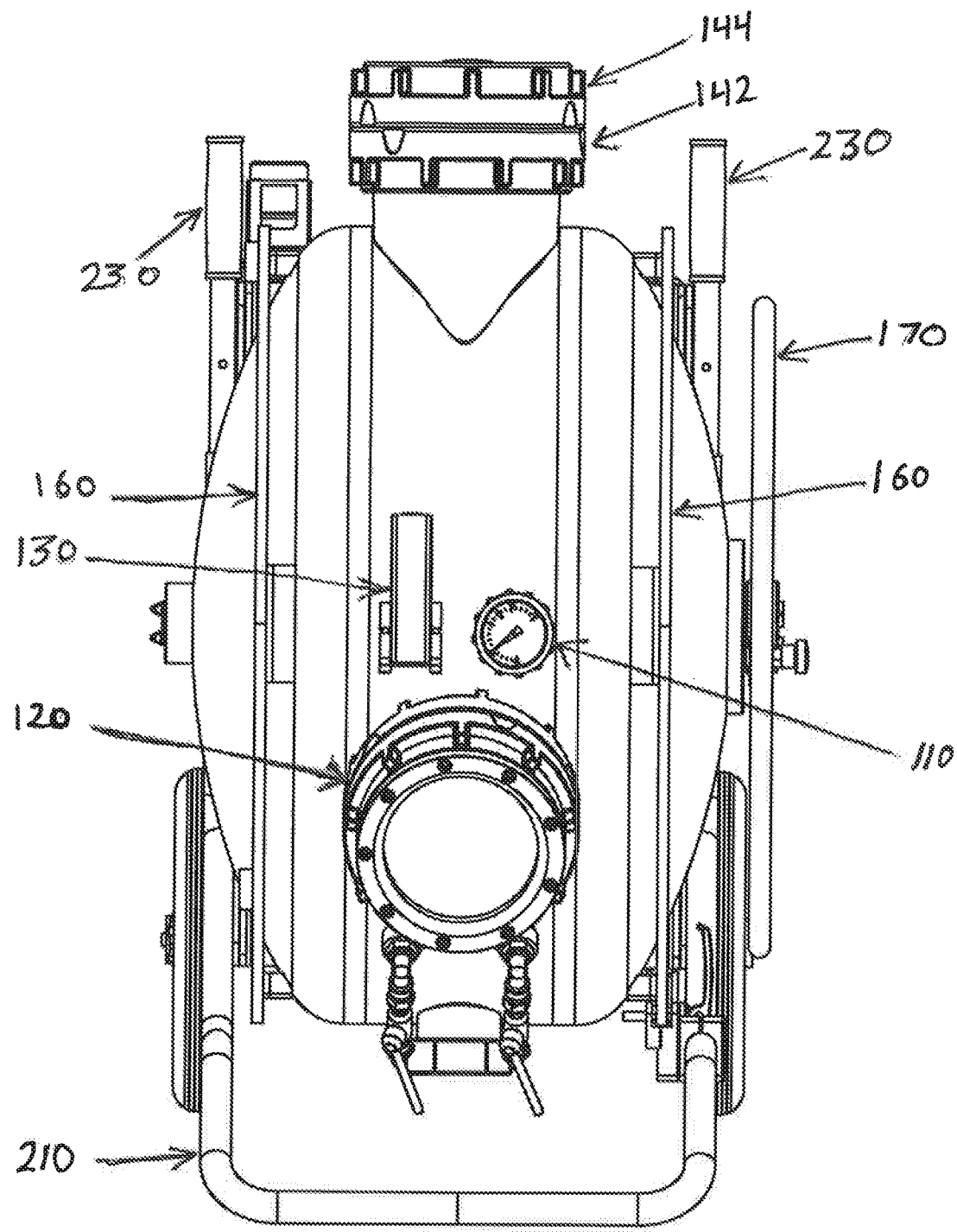
FIG. 5.—is a top view of the inversion system

Referring now to FIG. 5, a top view of the inversion system (10) is shown. Connected to the peripheral surface of the drum (100) is a pressure gauge (110) and a pressure relief valve (130). Upon entrance of a compressed gas through the inlet valve (112), the internal pressure of the drum increases until it reaches the acceptable pressure required for pushing the liner into the pipe. The pressure gauge (110) reads the internal pressure of the drum (100) which can be in the range of 0 Pa to 248.000 Pa.

Conversely, a pressure relief valve (130) is also mounted on the peripheral surface of the drum (100) which facilitates rapid escape of the pressurized gas within the drum (100) if the pressure exceeds a predetermined value above the internal max allowable pressure for which the drum is designed.

Figure 6:
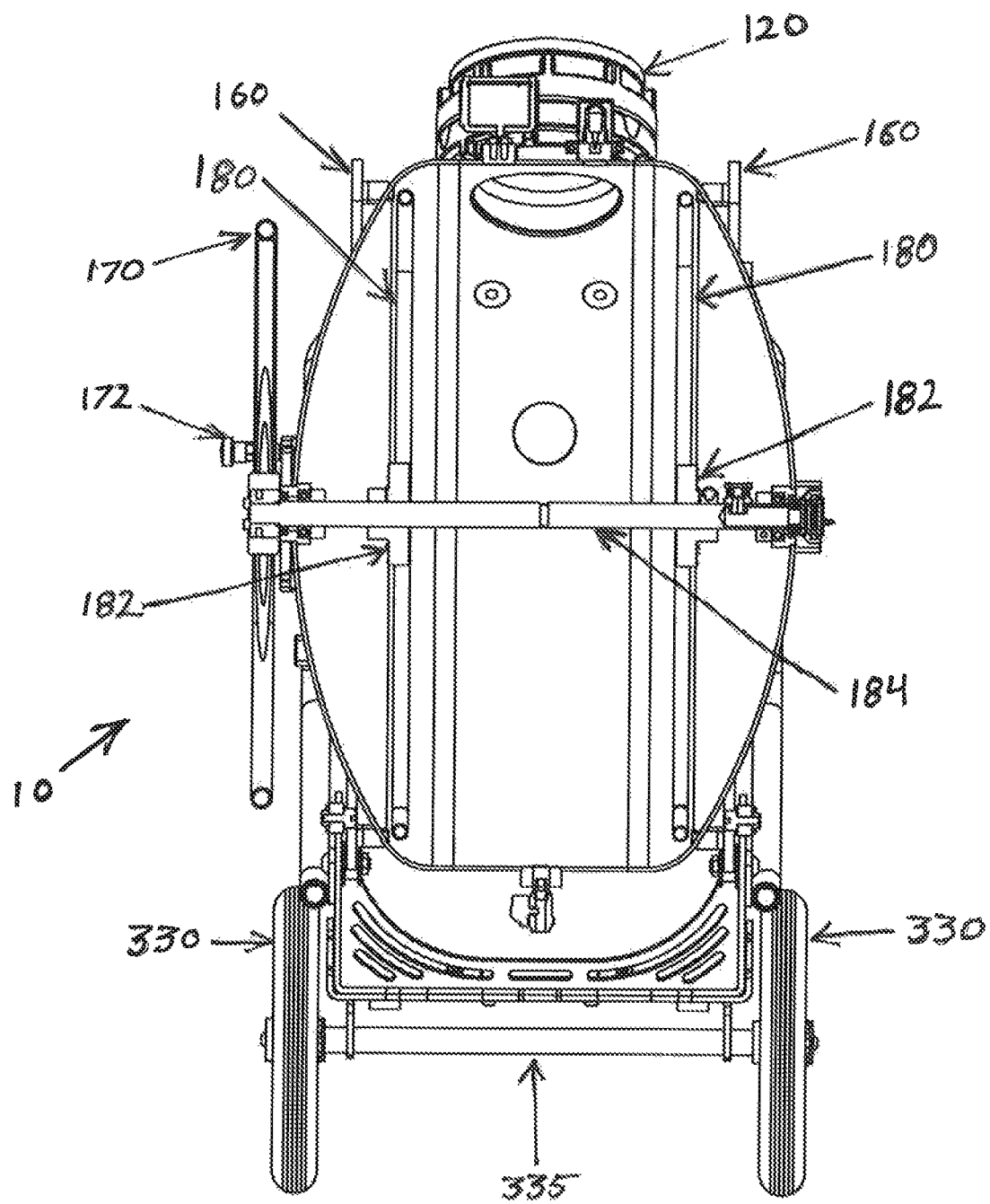
FIG. 6.—is a front cross-section view of the inversion system

Referring now to FIG. 6, a cross-section view of the inversion system (10) is shown from the front side. Disposed within the interior of the inversion drum (100) resides two internal wheel separators (180) for retaining the pipe liner as it is rolled around the center shaft (184) and providing support to the liner from the center shaft (184) to the maximum diameter of rolled liner. The internal wheel separators (180) are connected to the center shaft through a clamping ring (182) which further allows the delimiters to adjust axially along the center shaft (184) thereby generally accommodating internal support for liners flat width in the range from 0 mm to 265 mm. The center shaft (184) is supported through bearings mounted in the right side (104) and left side (102) and further connects to the drum handle (170). A biased plunger pin (172) is fixed to the drum handle (170) and engages a locking plate (174) to inhibit rotation of the drum handle (170), center shaft (184), and internal wheel separators (180) and thus, inhibiting progression of the liner in or out of the drum.

Figure 7:
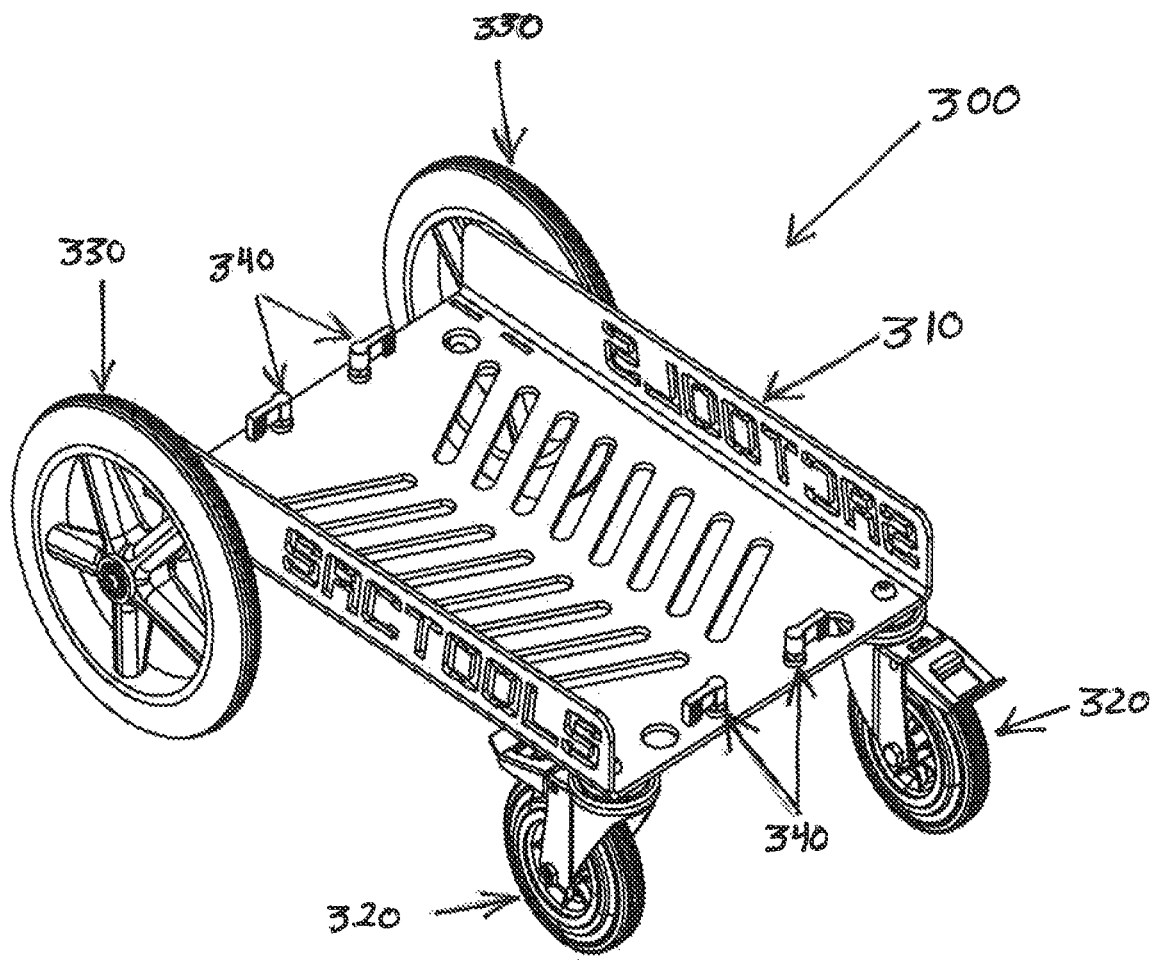
FIG. 7.—is a perspective view of the wheelbase

Referring now to FIG. 7, a perspective assembly view of the base assembly (300). The base assembly (300) includes a mounting support (310), which is generally flat and metallic and has the sides formed upwards to support the frame assembly (200). Also included and rotatably mounted to the frame is at least one releasable locking provision (340) but preferably four. The locking provision (340) is shaped with a generally round profile with an extended portion which facilitates locking engagement with the frame assembly (200) upon rotation of the locking provision (340).

Figure 8:
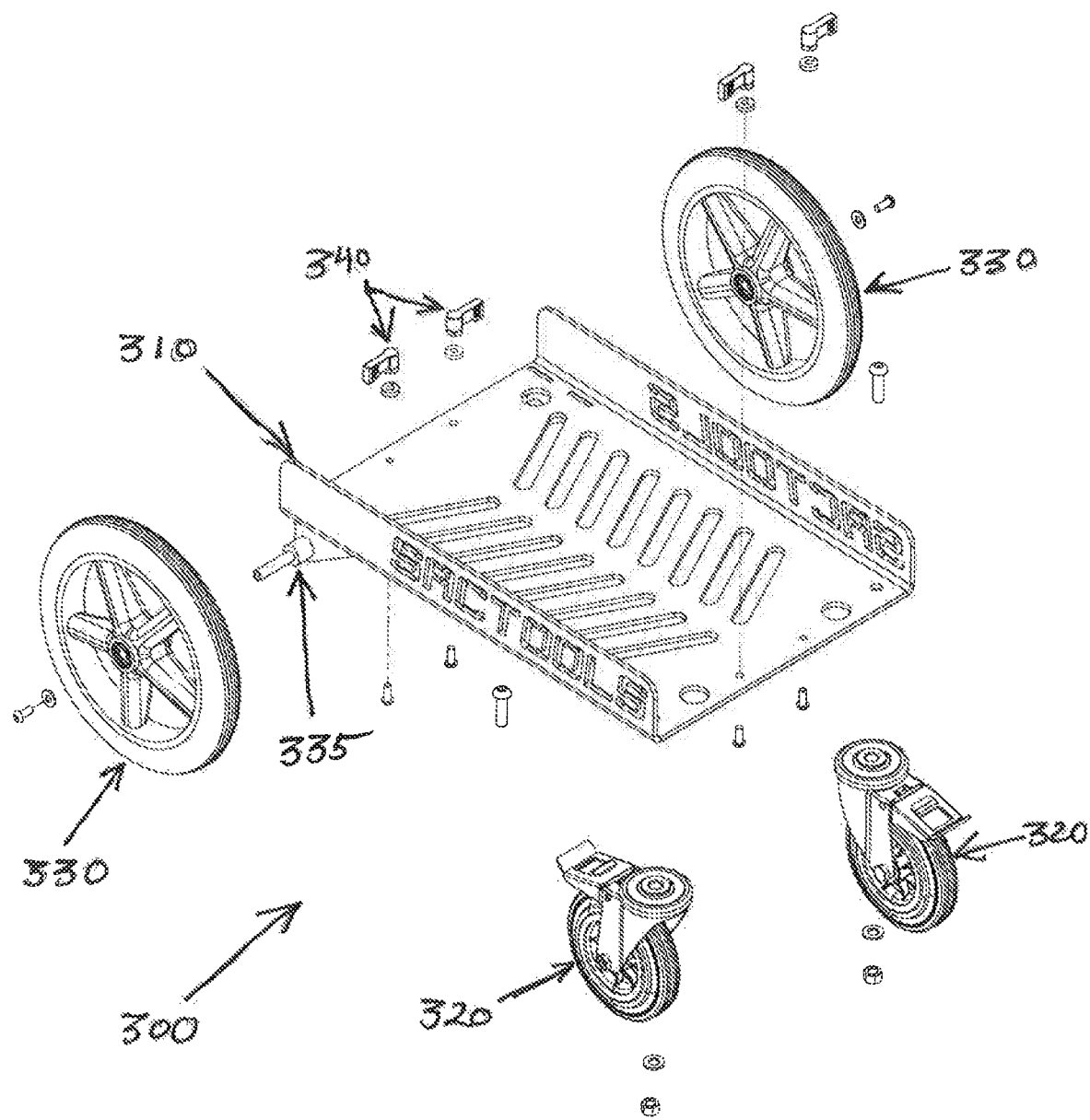
FIG. 8.—is an assembly view of the wheelbase

Referring now to FIG. 8, a perspective assembly view of the base assembly is shown. Two rear wheels (330) and two front wheels (320) are shown connected to the frame of the assembly (300). The rear wheels (330) are generally larger than the front wheels (320) and are preferably fixed, in that the rear wheels (330) do not pivot about a vertical axis. However, the rear wheels are not limited to being fixed and it is conceived that the rear wheels (330) could be mounted without an axle (335) and instead mounted to the mounting support (310) which would provide multi-directional movement of the rear wheels (330). Likewise the front wheels (320) are intended to pivot and provide multi-direction movement, however, it is also conceived that fixed wheels with an axle could be used. It is preferred that at least one wheel is provided with a locking provision. As shown, a traditional friction lock is indicated. However, the design is not limited to this type of wheel lock and other types of wheel locks could be employed to produce the same effect.

Figure 9:
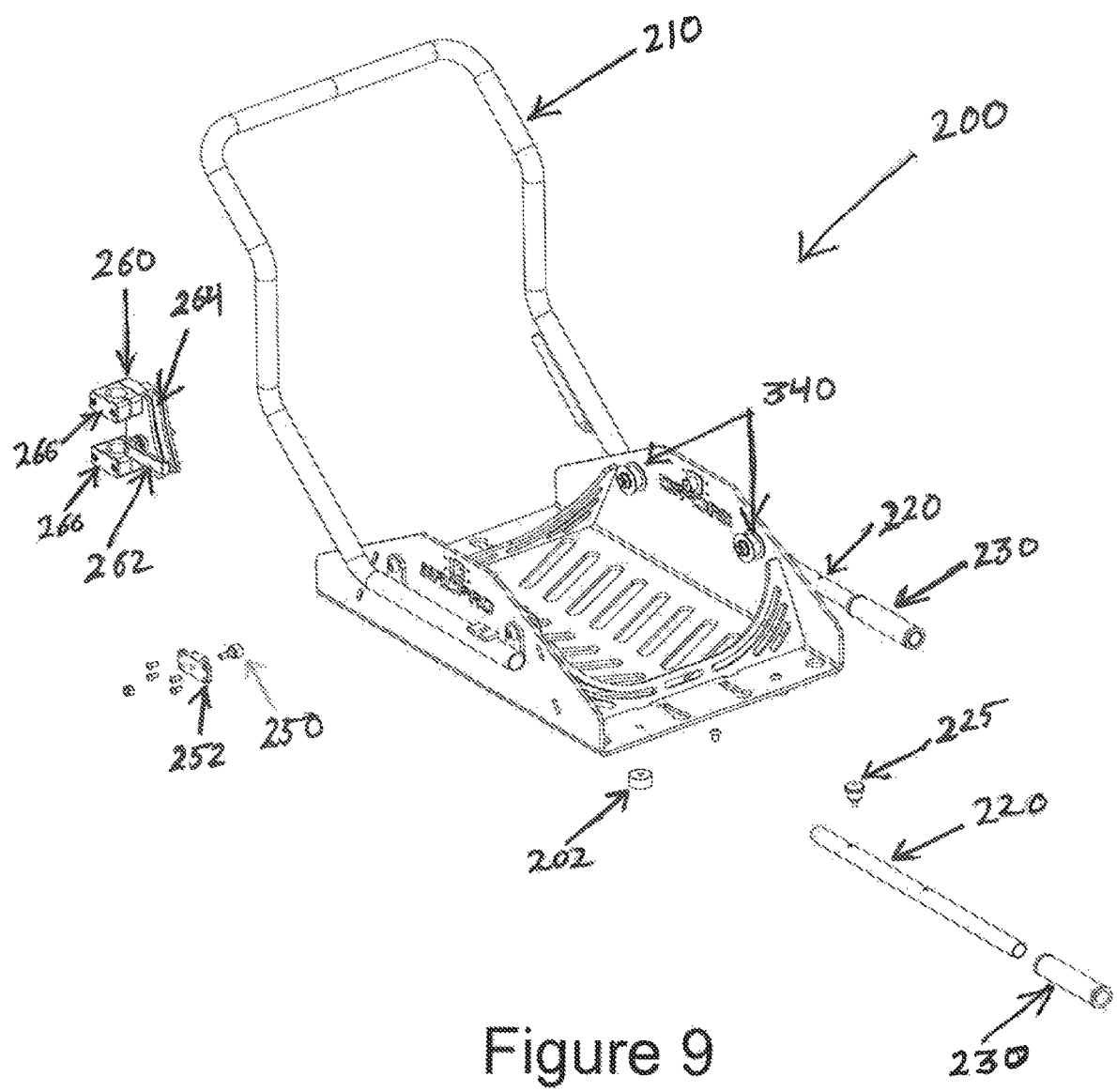
FIG. 9.—is an assembly view of the supporting base with handles

Referring now to FIG. 9, a perspective assembly view of the frame assembly (200) is shown. Provided in a flat framework, generally made from a metallic material, is a frame base which includes sides which are formed upwards. The frame base and sides of the frame assembly (200) are sized to fit within the base assembly (300) and inhibit side to side motion.

A tubular handle assembly (210) is mounted to the upward forms of the frame base creating a rigid structure capable of supporting the weight of the inversion drum when carried. The tubular handle assembly (210) is further formed in a generally "U" shape to mount on both the left and right sides of the base and further provide a handle engagable by a user. At the forward end of the handle assembly (210) are openings for receiving a tubular carrying handle (220). The tubular carrying handles (220) are sized to fit within the tubular handle assembly (210) and lock in predetermined positions by way of a plunger (225) which is mounted to a plate on the handle assembly (210) and protrudes through the plate, handle assembly (210), and holes in the carrying handle (220). Therefore, the carrying handle (220) can be positioned closer or farther away from the drum. To provide an improved support while carrying, a grip (230) is slid over the most forward end of the carrying handle (220), and is generally made from rubber. However, it is conceived that other materials such as ABS, Polypropylene, Polystyrene, or other polymeric or elastomeric materials could be used.

Additionally, a braking assembly is connected to the handle assembly (210) and includes a mounting plate (260), a lever (262), an opening (264), and mounting clamps (266). The mounting clamps (266) are mounted to the mounting plate (260) and further clamps the braking assembly to the handle assembly (210). The opening (264) is sized and shaped to receive the rails (160) and provide free rotation through the opening when a friction pad is not engaged. A lever (264) is provided which is connected through the mounting plate (260) and to the friction pad. The lever (264) is typically a cam style lever and when closed, compresses the friction pad against the rails (160) the restrict rotational movement of the inversion drum (110).

Also included in the frame assembly are four support rollers (340), of which, two are rotatably fixed to the left inner side of the frame base and two are rotatably fixed to the right inner side of the frame base. The rollers support the weight of the inversion drum (110) and allow rotatable positioning of the drum (110). Furthermore, at least one upper roller (250) is provided and mounted to the internal side of the frame base through a mounting plate (252), and provides a way to capture and hold the rails (160) in place.

Figure 10:
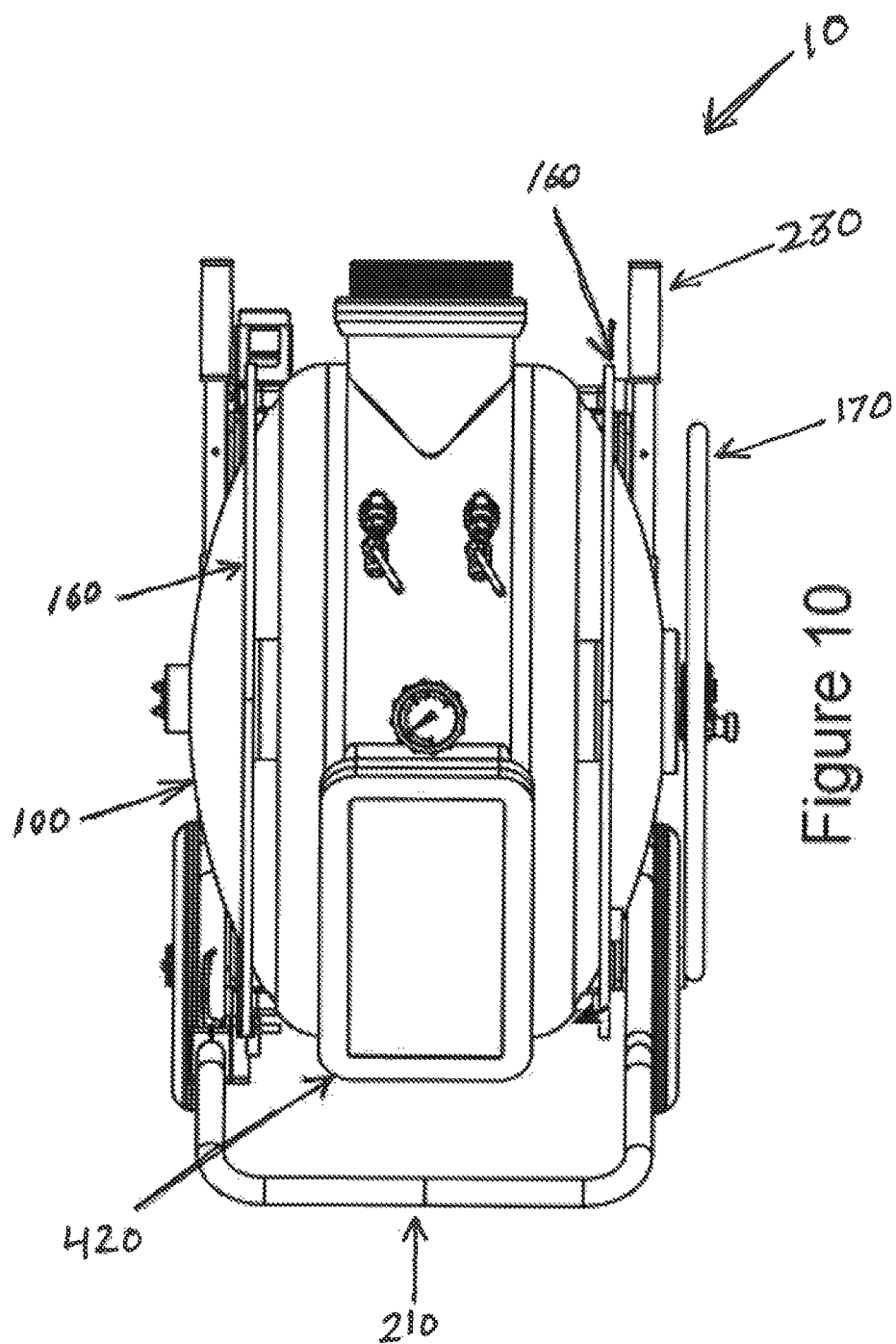
FIG. 10.—is a top view of the inversion system

Referring now to FIG. 10, a top view of the inversion system (10) is shown. A generally rectangular viewing window (420) is removable coupled to the peripheral surface of the inversion drum (100) and operable to promote a larger viewing area while continuing to maintain a stable pressure within the inversion drum (100). The rectangular viewing window (420) comprises a plurality of fasteners (not shown) to securely couple the rectangular window (420) to the inversion drum (100). The rectangular viewing window (420) generally comprises a tempered glass supported within a retaining ring. The retaining ring is operable to permit the acceptance of the fasteners and compress a gasket between the rectangular viewing window (420) and the inversion drum (100). The gasket is generally a rubber style o-ring but may also be made from felt, paper, or other acceptable sealing material.

Figure 11:
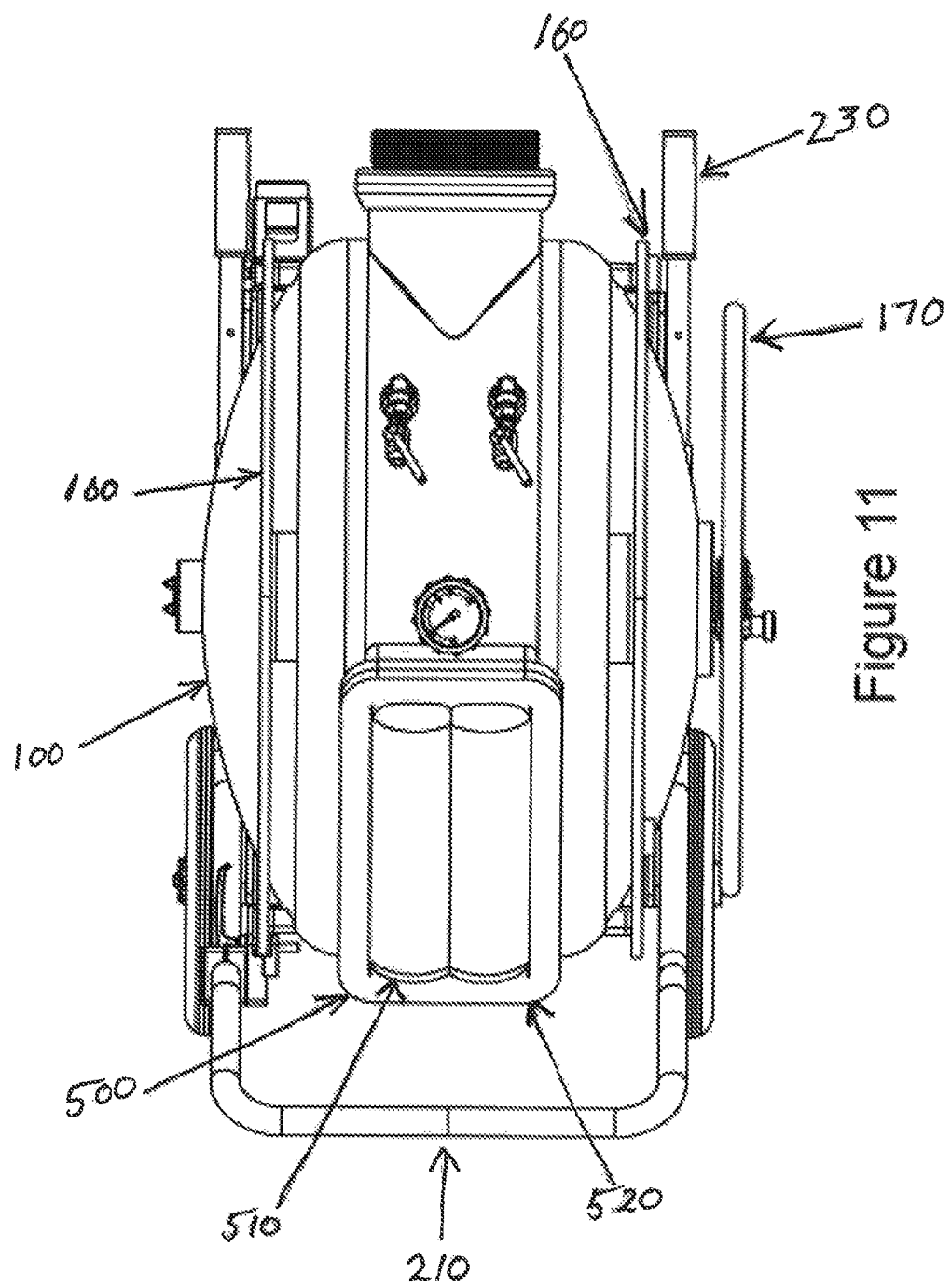
FIG. 11.—is a top view of the inversion system with additional sluice

Referring now to FIG. 11, a top view of the inversion system (10) is shown with an optional sluice assembly (500). The sluice assembly (500) promotes the continuous operation of an the inversion system (10) by allowing for an unlimited length of liner to be used. The sluice assembly (500) is removably coupled to the peripheral surface of the inversion drum (100) through the use of a plurality of fasteners (not shown). To attach the sluice assembly (500), a user would remove the viewing window (420) from the inversion drum (100) and attached the sluice assembly (500) in its place.

The sluice assembly (500) comprises an inflatable bladder (510) generally made from rubber or silicone but any elastomeric material would suffice. The inflatable bladder (510) is retained in a generally metallic surround (520). The surround (520) is operable to permit the acceptance of a plurality of fasteners and secure the sluice assembly (500) to the inversion drum (100). Once the inflatable bladder (510) is inflated, the opening created by the uninflated bladder (510) is closed and seals the inside of the inversion drum (100) thereby prohibiting the exist of pressurized gas from the inversion drum (100). A liner may be pre-fed into the drum and prepared appropriately for the relining operation with the excess liner exiting through the sluice assembly (500). The inflated bladder (510) securely maintains the pressure seal on the liner which prohibits the escape of pressurized gas from the inversion drum (100). As liner is fed from the inversion drum (100) into the pipe needed to be relined, it is drawn through the inversion drum (100) and through the sluice assembly (500) while continuing to maintain a static internal pressure. As such, an unlimited amount of liner could be fed into a pipe without the need to stop operation and insert additional liners.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. A device for relining pipes, comprising:
a generally cylindrical drum having generally curved sides, the generally cylindrical drum operable to invert a liner;
at least one opening, the opening disposed on the surface of the generally cylindrical drum;
a shaft, the shaft disposed inside of the generally cylindrical drum at a central axis of the generally cylindrical drum and operable to allow the liner to wrap and unwrap around the shaft;
a drum handle, the drum handle coupled to the center shaft and disposed outside the generally cylindrical drum and operable to rotate the shaft;
a locking plate, the locking plate coupled to the generally cylindrical drum and the drum handle and disposed outside the generally cylindrical drum;
at least one arcuate rail, the arcuate rail coupled to the generally cylindrical drum;
a frame assembly;
the frame assembly comprising a plurality of supports, the supports in contact with the arcuate rail to permit the rotation of the drum on the frame approximately around the central axis of the generally cylindrical drum and position the generally cylindrical drum and the opening in a desired orientation;
the frame assembly further comprising a handle and a brake assembly;
the break assembly coupled to the handle and the arcuate rail;
wherein the arcuate rail is located within the outermost point of the curved sides;
wherein when the brake assembly is disengaged, the drum is free to rotate on the supports;
wherein when the brake assembly is engaged, the drum is not permitted to rotate on the supports; and
wherein when the drum handle has a locked state and an unlocked state; the unlocked state permitting the drum handle to rotate and the liner to exit the drum, and the locked state does not permit the drum handle to rotate and the liner to exit the drum.

2. The device of claim 1, wherein the supports are made up of a plurality of lower rollers and at least one upper roller, and the arcuate rail is disposed between the plurality of lower rollers and the at least one upper roller.

3. The device of claim 1, further comprising at least one internal separator wheel;

the internal separator wheel disposed within the generally cylindrical drum and coupled to the shaft.

4. The device of claim 3, wherein the internal separator wheel is operable to permit individual point contact to the liner and is axial adjustable along the shaft.

5. The device of claim 1, wherein the at least one arcuate rail forms a complete circle.

6. The device of claim 1, further comprising a sight window;

the sight window removably coupled on the surface of the generally cylindrical drum and operable to permit viewing of the inside of the generally cylindrical drum.

7. The device of claim 1, further comprising at least one input valve, at least one release valve, at least one pressure gauge, and at least one pressure relief valve;

the at least one input valve disposed on the generally cylindrical drum and operable to permit the entrance of a gas into the drum;

the at least one release valve disposed on the generally cylindrical drum and operable to permit the exit of a gas out of the drum;

the at least one pressure gauge disposed on the generally cylindrical drum and operable to measure the pressure within the drum, and the at least one pressure relief valve disposed on the generally cylindrical drum and operable to permit the exit of a gas out of the drum when the pressure within the drum exceeds a predetermined valve.

8. The device of claim 1, further comprising a set of adjustable handles;

Wherein the adjustable handles are releasably coupled to the frame assembly.

9. The device of claim 8, wherein the adjustable handles can be secured in a first position, a second position, and wherein the adjustable handles can be completely removed from the frame assembly.

10. The device of claim 1, wherein the device is rated as a pressure vessel.

11. A device for relining pipes, comprising:

a generally cylindrical drum having generally curved sides, the generally cylindrical drum operable to invert a liner;

at least one opening, the opening disposed on the surface of the generally cylindrical drum;

a shaft, the shaft disposed inside of the generally cylindrical drum at a central axis of the generally cylindrical drum and operable to allow the liner to wrap and unwrap around the shaft;

a drum handle, the handle coupled to the center shaft and disposed outside the generally cylindrical drum and operable to rotate the shaft;

a locking plate, the locking plate coupled to the generally cylindrical drum and the drum handle and disposed outside the generally cylindrical drum;

at least one arcuate rail, the arcuate rail coupled to the generally cylindrical drum;

a frame assembly, the frame assembly comprising a plurality of supports, the supports in contact with the arcuate rail to permit the rotation of the drum on the frame approximately around the central axis of the generally cylindrical drum and position the generally cylindrical drum and the opening in a desired orientation;

the frame assembly further comprising a handle and a brake assembly;

the break assembly coupled to the handle and the arcuate rail;

a base assembly, the base assembly releasably coupled to the frame assembly and further comprising a plurality of wheels, the wheels operable to permit movement of the device across a surface;

wherein the arcuate rail is located within the outermost point of the curved sides;

wherein when the brake assembly is disengaged, the drum is free to rotate on the supports;

wherein when the brake assembly is engaged, the drum is not permitted to rotate on the supports; and wherein when the drum handle has a locked state and an unlocked state; the unlocked state permitting the drum handle to rotate and the liner to exit the drum, and the locked state does not permit the drum handle to rotate and the liner to exit the drum.

12. The device of claim 10, wherein the supports are made up of a plurality of lower rollers and at least one upper roller, and the arcuate rail is disposed between the plurality of lower rollers and the at least one upper roller.

13. The device of claim 11, further comprising at least one internal separator wheel;

the internal separator wheel disposed within the generally cylindrical drum and coupled to the shaft.

14. The device of claim 13, wherein the internal separator wheel is operable to permit individual point contact to the liner and is axial adjustable along the shaft.

15. The device of claim 11, wherein the at least one arcuate rail forms a complete circle.

16. The device of claim 11, further comprising a sight window;

the sight window removably coupled on the surface of the generally cylindrical drum and operable to permit viewing of the inside of the generally cylindrical drum.

17. The device of claim 11, further comprising at least one input valve, at least one release valve, at least one pressure gauge, and at least one pressure relief valve;

the at least one input valve disposed on the generally cylindrical drum and operable to permit the entrance of a gas into the drum;

the at least one release valve disposed on the generally cylindrical drum and operable to permit the exit of a gas out of the drum;

the at least one pressure gauge disposed on the generally cylindrical drum and operable to measure the pressure within the drum; and the at least one pressure relief valve disposed on the generally cylindrical drum and operable to permit the exit of a gas out of the drum when the pressure within the drum exceeds a predetermined valve.

18. The device of claim 11, further comprising a set of adjustable handles;

Wherein the adjustable handles are releasably coupled to the frame assembly.

19. The device of claim 18, wherein the adjustable handles can be secured in a first position, a second position, and wherein the adjustable handles can be completely removed from the frame assembly.

20. The device of claim 11, wherein the device is rated as a pressure vessel.

* * * * *